(12) United States Patent
Halliday et al.

(10) Patent No.: US 9,807,049 B2
(45) Date of Patent: Oct. 31, 2017

(54) SYSTEMS AND METHODS TO PRESENT MESSAGES IN LOCATION-BASED SOCIAL NETWORKING COMMUNITIES

(71) Applicant: erodr, Inc., Soquel, CA (US)

(72) Inventors: Drew Duncan Halliday, Kirkwood, MO (US); Andrew Robert Halliday, Soquel, CA (US)

(73) Assignee: ERODR, INC., Soquel, CA (US)

( * ) Notice: Subject to any disclaimer, the term of this patent is extended or adjusted under 35 U.S.C. 154(b) by 263 days.

(21) Appl. No.: 14/533,022

(22) Filed: Nov. 4, 2014

(65) Prior Publication Data

US 2015/0058957 A1 Feb. 26, 2015

Related U.S. Application Data

(63) Continuation-in-part of application No. 14/285,551, filed on May 22, 2014.

(60) Provisional application No. 61/827,504, filed on May 24, 2013.

(51) Int. Cl.
| | |
|---|---|
| *G06F 7/04* | (2006.01) |
| *H04L 29/06* | (2006.01) |
| *H04L 12/58* | (2006.01) |
| *G06F 3/0481* | (2013.01) |
| *G06F 3/0482* | (2013.01) |
| *H04W 4/02* | (2009.01) |
| *H04W 12/02* | (2009.01) |
| *H04W 12/06* | (2009.01) |
| *G06Q 50/00* | (2012.01) |

(52) U.S. Cl.
CPC ............ *H04L 51/32* (2013.01); *G06F 3/0482* (2013.01); *G06F 3/04817* (2013.01); *G06Q 50/01* (2013.01); *H04L 51/20* (2013.01); *H04W 4/02* (2013.01); *H04W 12/02* (2013.01); *H04W 12/06* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 6,711,493 B1 * | 3/2004 | Andrews .............. | G08G 1/0104 340/903 |
| 8,606,792 B1 | 12/2013 | Jackson et al. | |
| 2003/0172067 A1 * | 9/2003 | Adar ...................... | G06Q 30/02 |
| 2008/0045236 A1 | 2/2008 | Nahon et al. | |
| 2009/0319518 A1 | 12/2009 | Koudas et al. | |

(Continued)

OTHER PUBLICATIONS

Social Discovery for Location-based Communities, U.S. Appl. No. 14/285,551, filed May 22, 2014, Drew Halliday, et al.

(Continued)

*Primary Examiner* — Fatoumata Traore
(74) *Attorney, Agent, or Firm* — Greenberg Traurig, LLP

(57) ABSTRACT

Systems and methods to let users connect authentically with new people anywhere nearby in homes, offices, classrooms, dorms, bars, etc., where the users can be who they really are, and also say what they want without fear, using periodic anonymized posting of expiring content from an otherwise attributed user profile. Users put out a broadcast message and get back personal communications. A one-to-many message from a user results in a one-to-one private communication, which feature may be referred to as "social to personal".

18 Claims, 9 Drawing Sheets

(56) References Cited

U.S. PATENT DOCUMENTS

| | | | |
|---|---|---|---|
| 2011/0153737 A1* | 6/2011 | Chu | H04L 67/104 |
| | | | 709/204 |
| 2012/0143963 A1 | 6/2012 | Kennberg et al. | |
| 2012/0197967 A1* | 8/2012 | Sivavakeesar | G06Q 50/01 |
| | | | 709/203 |
| 2013/0031183 A1* | 1/2013 | Kumar | H04L 12/5825 |
| | | | 709/206 |
| 2013/0041893 A1* | 2/2013 | Strike | G06F 17/3089 |
| | | | 707/723 |
| 2014/0189536 A1 | 7/2014 | Lange et al. | |
| 2015/0188873 A1 | 7/2015 | Halliday et al. | |

OTHER PUBLICATIONS

Systems and Methods to Control the Lifetime of Online Posts, U.S. Appl. No. 14/588,338, filed Dec. 361, 2014, Drew Halliday, et al.

* cited by examiner

US 9,807,049 B2

SYSTEMS AND METHODS TO PRESENT MESSAGES IN LOCATION-BASED SOCIAL NETWORKING COMMUNITIES

RELATED APPLICATIONS

The present application is a continuation-in-part (CIP) application of U.S. patent application Ser. No. 14/285,551, filed May 22, 2014 and entitled "Social Discovery for Location-based Communities", which claims priority to Prov. U.S. Pat. App. Ser. No. 61/827,504, filed May 24, 2013 and entitled "Social Discovery for Location-based Communities," the entire disclosures of which applications are hereby incorporated herein by reference.

FIELD OF THE TECHNOLOGY

At least some embodiments of the present application relate to computer apparatuses configured to provide social networking services in general and more particularly, but not limited, control of access to messages provided in a computing system for social networking.

BACKGROUND

Computing systems have been configured to provide social networking sites, in which users may post electronic messages presented to other users, such as friends and followers of the respective users. In some systems, the viewers of a posted message are provided with user interfaces to comment on the posted message, and/or to discuss among the viewers, and/or to discuss with the users who posted the initial message, and/or provided subsequent comments associated with the initial message.

Some computing systems are configured to provide geosocial applications, in which a user is presented with a user interface to chat with other registered users who are currently present in a geographical area near the current location of the user. Such geo-social applications may suffer from the "Empty Room" problem, in which the low density of users in a geographic area results in infrequent matches, poor content freshness, and/or poor content quality from a too-thin group of local users.

DETAILED DESCRIPTION

Figure 1:
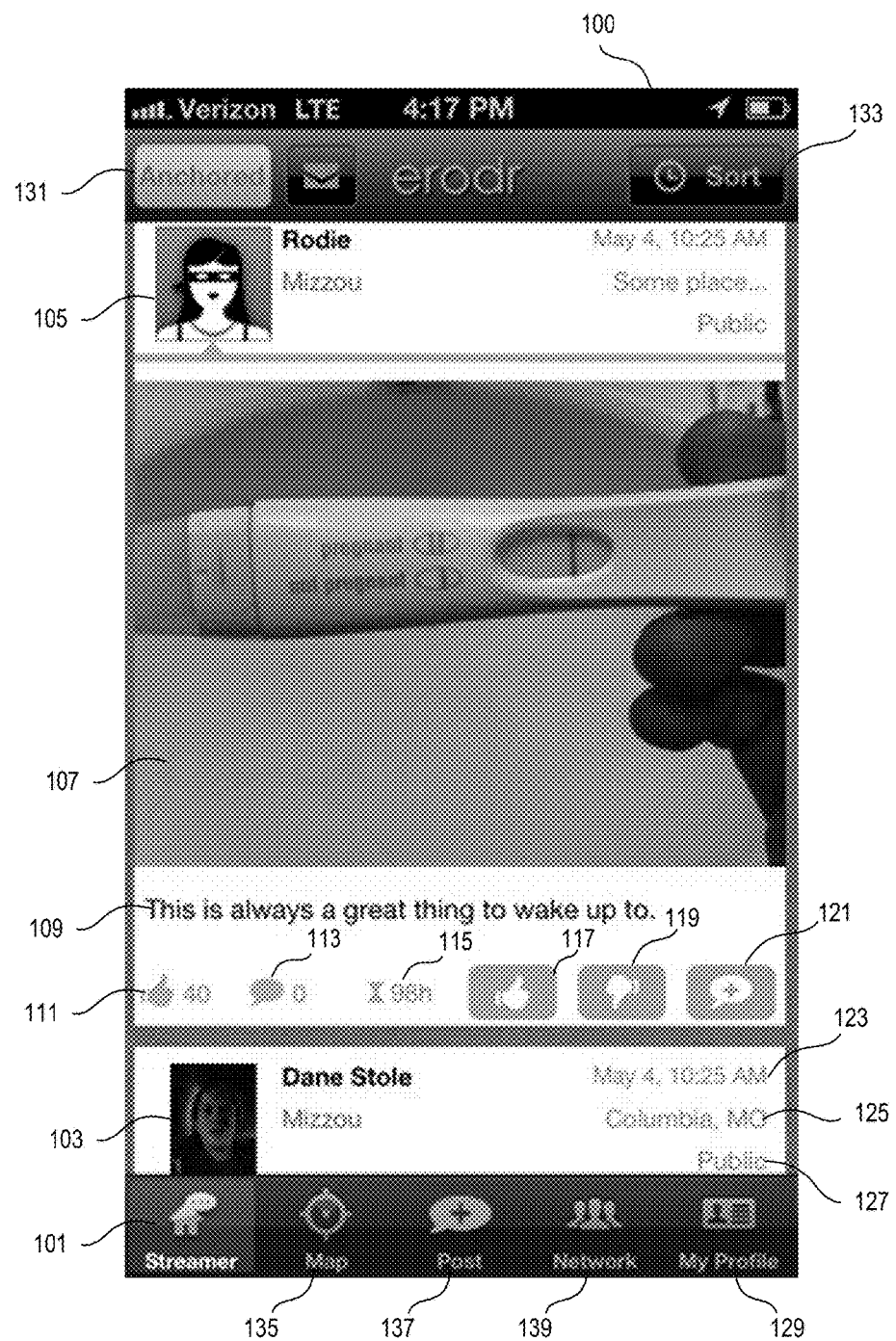
FIG. 1 shows a user interface configured to present messages in a social network according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In one embodiment, a computing system (e.g., implemented as a social networking application "erodr") is configured to combine geographically limited message broadcasting within a nearby community with privacy features on the responses to posts. The computing system provides a new model of communication, in which individuals can safely broadcast a message to many and receive private communications back from individuals among the many. The private responses establish the basis for private communications.

In one embodiment, a mobile application in the computing system is configured to allow a user to alternate between a) posting with a personal profile, and b) posting anonymously in such a way that other users of the same application running on their respective devices are able to add, to the post, user-identifiable comments and messages that are revealed only to the undiscoverable author of the post, but those users providing comments and messages cannot see comments and messages from others nor discover the identity of the author of the post.

The mobile application enables social discovery (e.g., meeting and communicating with new individuals) in a community while still allowing the greater freedom of expression available with selectable anonymity.

For example, using the mobile application, users can safely post a question or content without being identified, and get responses that are private to them only. Using the mobile application, users can also post openly with their identity in the next moment, without revealing connection discoverable between the two posts, one posted anonymously and one posted non-anonymously, in any data on the application. This is a new model of community social media. It is uniquely well-suited, for example, to social network applications and sharing in patient communities.

For a user authoring an anonymous post using the application to be able to see the comments and likes on the post they authored, the authoring user is required to authenticate their application as the owner of the anonymous post.

In one embodiment, the computing system performs the authentication based on user ID with login. When a user activates a user interface to see a post authored by the user, the application can receive, via from the server via an API (Application Programming Interface), the list of post IDs of any active anonymous posts that were authored by the authenticated user of the user interface. Nobody else in the system receives this list that corresponds to the authoring user. The anonymous posts identified in the list are provided to the application of the authenticated user application, allowing the user to view the list of likers of an anonymous post authored by the user and the list of comments on the anonymous post. Users other than the authorizing user of the anonymous posts are denied the access to view the private signals and messages associated with the anonymous posts, such as the list of likers of the anonymous post and the list of comments on the anonymous post.

In one embodiment, the anonymous posts are stored in the server in association with the identities of the authors of the respective posts. When a mobile application used by a user is authenticated, the anonymous posts that authored by the user are identified and provided to the mobile application used by the user for viewing.

In one embodiment, the identity of the author of an anonymous post is encrypted in the post information itself, which allows the server to provide access only to the author who can authenticate their identity with the encoded author identity on the post. In one embodiment, the authenticated mobile application used by the author is configured to hold the private key for encryption. The corresponding public key can be used to verify that the user is the author; and upon authenticating the user as the author of the anonymous post, the user is provided with access to private signals and messages associated with the anonymous post.

In one embodiment, the computing system is configured to display the number of responses/comments to a post to any user of the system, as an indication of the popularity of that post and how much activity it has generated, but the content of the responses/comments is not provided users other than the authorizing user who authored the post. The identity of the persons responding with a comment is viewable by the author of the post but not the other users of the system. Thus, the identity and content of comments from persons responding via the system are private for the author of the post, but not publicly presented to other users of the system.

In one embodiment, when a user puts up a post on the computing system, and a viewer comments on, or likes, the post, it would be similar to having direct message (DM) or text or email or some other 1:1 private communication be the medium of response. The arrangement is unlike other social media where responses to content are typically viewable by all other persons connected to the author of the content.

Using the system of the present application, users can cast a wide net and from this action develop new private social connections and communications. The system provides the unique functionality that allows the use of daily local social media broadcast or selective multicast to and within a community to arrive at private personal communications. The system is particularly applicable to the objective of taking an online network and community experience into offline friendships, relationships or meetings and activities.

Crowded Mixed Room

In one embodiment, the computing system is configured to provide a communication platform for users in a local geographical region that has a crowded user base.

For example, the computing system may provide a communication platform to users within a 5 mile radius of the center of a college campus. In such a geographical area, there can be a large number (e.g., in the order of 50,000) eligible community members and tens of thousands of active users.

In one embodiment, the computing system of the present disclosure uses range limits on local views in combination with age, gender and school affiliation filters to reduce the viewable field to a more immediately relevant local population.

Narrowing the field of view of a post by restricting viewing range in combination with age and gender filters allows users to segment a large dense local population. Without the combination of filters, thousands would otherwise simultaneously post to the open location-based community and overwhelm the feed. Relevance increases with proximity, affinity, and compatibility. The computing system of the present disclosure uses these factors for sense-making. In dense communities using proximity as a filter is a way of culling a too-rich field of targets all within a reachable distance.

Dislike

The computing system of the present disclosure provides users with a "dislike" action on a post. A viewer of the post may optionally activate the "dislike" action to increase the count of dislikes of the post by different users.

The "dislike" action allows for crowdsourced collaborative filtering and curation.

In one embodiment, each net dislike action on a post (content+profile) reduces the remaining time for display of the post, and reduces the viewable range of that post.

For example, if the default viewable range is 10 miles from the post location (e.g., the location of the user posted the message), a predetermined number of net dislikes given to the post (e.g., subtracting likes from dislikes) can shrink the viewable range to 500 yards from the post location, while just one more dislike will reduce the viewable range down to zero and thus make the post not visible in the streamer of the system. Such a configuration rapidly reduces the available population of viewers when cumulative net dislikes are recorded against a posting.

Flags

In one embodiment, any post in the computing system of the present disclosure can be flagged for abuse/violation of standards. For example, a predetermined number of flags given to a post by different users is configured to cause the system to remove the post from viewing.

In one embodiment, administrative representatives of the computing system are provided with user interfaces to mark users who misuse the flag actions to suppress posts unfairly. The marking reduces the ability of the marked users to flag posts within the system.

Community Curation

In one embodiment, the computing system of the present disclosure provides users with a "like" action on a post (a message posted in the system). A viewer of the post may optionally activate the "like" action to increase the count of dislikes of the post by different users.

In one embodiment, likes given by different users to a post extend viewable range and duration of the post.

For example, posts with many likes from one campus can grow in viewable range across the country and persist for up to predetermined number of days (e.g., 10 days). Such an arrangement automatically creates a "best content" distribution across geography. The most liked posts from Mizzou are viewable locally in California. So even if there is no community locally, users of the computing system of the present disclosure can see the best content from around the country from various colleges.

Privacy Settings

In one embodiment, a user is provided with a tool to present an anonymous post from an otherwise public profile (incognito mode). The system uses a method to anonymize an otherwise attributable post in a manner such that a hacker cannot find any identifying information (other than gender in one embodiment) about the poster in the transmissions of data to viewers devices, and yet the attributed likes and comments on that post can be correctly delivered to the correct author, who is otherwise unidentifiable to others.

In one embodiment, when a user elects to post anonymously, the content is sent to the server securely with a unique post ID. When sending the content to viewers devices, the server replaces the user identification with a user ID XX for male and user ID YY for female. Likes and Comments from attributed viewers are accumulated on the unique post ID. When an author retrieves posts for display, the authenticated client requests a list of post ID numbers for any anonymous posts from that author. The client controls access to likes and comments (personal communications to the author) on her anonymous post by allowing display of Likes listings and Comments screens if the anonymous post ID is in the list of anonymous post ID numbers for that author.

In one embodiment, users can post up to a predetermined number of times anonymously per day. Posting anonymously changes the attribution of the profile of the posting user when the post is displayed in the streamer. The image and name of the user who elected to post anonymously are anonymized, but the gender of the now-anonymous poster is shown in the gender form of the profile image and name (masked gender-specific profile image icon, Anonymous Female, Anonymous Male). In respect of community moderation, anonymous posts are configured to be "fragile", net dislikes on an anonymous post cause it to disappear in fewer strokes than when the profile attribution is there. Also, when an anonymous post is flagged out of the streamer, the user is blocked from using anonymous for a period (e.g., 24 hours to a week, depending on the infraction history). Repeated "flags" of anonymous posts can lead to loss of anonymous privileges permanently, and can lead to user being banned from login.

Privacy on a public post through range and time limits: A user can decrease the visibility of a posting by restricting the viewable range and the window of time in which the post will be viewable. Setting a post to 100 yards and 30 minutes significantly reduces exposure, and after 30 minutes the expiration of the post results in its content being scrubbed from the system.

Anti-stalking provision while revealing post locations: the system presents the location of a post without identifying specific poster. In one embodiment, the system only revealing who posted a post to a viewer if the poster is a friend of viewer in the system.

In one embodiment, a user and a friend can establish a friend relationship in the system via mutual recognition in the system, in a way implemented in a typical social networking system.

Overall, the combination of these Privacy settings, including anonymous mode for posting, range limits, time limits, post delete on expiration, not revealing post location/poster identity to strangers, allows for a new model of "privacy in public" which may be the light model for local community social media bulletin boards broadly applied to any local community.

Conflict Diffusion

Expression of dislike in the computing system of the present disclosure provides a new possibility of measuring interpersonal relationship attitude between any two users, both positive and negative. The system accumulates patterns of negative sentiment toward others through dislike actions on their content. The dislikes can be used to rapidly identify emerging animus toward another user, and in the interest of preventing flaming and disdain for others in the open public forum, the computing system is configured to identify a threshold of cumulative negative attitude (hatred) and when the threshold is passed, the system is configured to silently remove visibility of the "hated" from the "hater".

For example, user B would dislike any post of user A, no matter the content, as soon as it appeared. This had more to do with personal animus than scoring the content of user A. The system is configured to avoid presenting the posting of user A to user B.

At the same time, because these "hater" attitudes can be transitory, the system is configured to allow posts from the hated to appear to the hating user, if and when posts of the hated users accumulate more likes than the hating user recorded in dislike for the hated. Thus, the dislikes from the hating user would have limited impact on the posts of the hated user.

In one embodiment, the system provides an anchor-to-campus feature, which is different from a magnifying glass that can be moved to a new location on the map. The anchor-to-campus feature includes a single validated home base that a user can move away from while maintaining (anchoring) the profile of the user back to the home location. Like a traveling correspondent away from alma mater, who can see and add to the local home location publications.

In one embodiment, the system is configured to allow gender-identified anonymous posts and endangered posts with shortest time remaining until being expunged.

In one embodiment, the system is configured to allow posts via "friends only" view in a public streamer with intermingled friends and strangers and filters to separate them. In combination with the "Friends Only" viewing restriction on a post allows the use of the system as a private social network for friends while easily switching back to the public view In one embodiment, posts in the computing system of the present disclosure expire when an expiration condition is met; and upon expiration, the expired post is scrubbed from the servers.

When a post is received in the system, the post begins with a predetermined of time limit to expiration (e.g., XX hours for the default initial post duration).

When the post receives a "like" from a user, the "like" adds lifetime to the post, but the added lifetime is not extended to a time limit set by the poster, if the poster elects to specify the time limit.

When the post receives a "dislike" from a user, the "dislike" acts to erode the post faster.

In one embodiment, anonymous posts erode more quickly than non-anonymous posts.

In one embodiment, the mobile applications are provided to run on mobile computing devices of users to provide user interfaces to the computing system of the present disclosure. For example, the mobile applications can be configured to run in tablet computers (e.g., iPad), smart phones (e.g., iPhone), digital media players, personal digital assistant, etc.

In one embodiment, a user of the mobile application can specify parameters that limits who can see the posts provided by the user. For starters, if the user does not specify any parameters, the posts of the user are presented only to other registered users computing system. If the user wants more privacy, the user can use range and audience settings to limit the visibility of the posts provided by the user. The user can optionally elect to post anonymously.

In one embodiment, the posts of the computing system are not presented on the web. Thus, internet search engines cannot be used to search for the profile, posts, pictures of the user of the computing system of the present disclosure.

In one embodiment, anonymous posts are locked within a private sector of the computing system of the present disclosure, accessible only by authorized personnel. For example, campus representatives are not provided with access to see who wrote anonymous posts. In one embodiment, an anonymous post has to be flagged several times by other students before authorized personnel can locate it to determine who wrote the post. Thus, anonymous posts are highly protected. The privacy of the users is extremely important to the system in one embodiment.

In one embodiment, a post with 0 "likes" is configured to disappear after 24 hours or less. Posts with lots of likes earn more time in the streamer unless the author of the post set a time limit. Posts with lots of dislikes are configured to disappear pretty quickly from the streamer.

In one embodiment, the system provides a user interface configured to allow a user to delete from the system a post authored by the user. For example, the user may go to the profile page of the user and swipe left to expose a "Delete" button, or click "Edit" and then a remove icon that appears next to each post.

In one embodiment, the computing system is configured to be location-based according to college campus. If the user is away from the campus (e.g., more than 10 miles away on vacation), the user may choose to "Anchor On" a campus. For example, the user may Anchor On by clicking "Post" and sliding the option to "On." The user may also Anchor from a Map. When the user turns on the "Anchor On" option, the range for posting is set to "No Limit."

In one embodiment, while everybody can see the # of likes a post has, only the poster can see the identity of those who liked their post. Thus, a user cannot see who liked other people's posts.

In one embodiment, comments to a post are private communication between the poster and the commentator, sort of like a private message. Thus, a user can only see comments on the posts of the user, but not the comments on the posts of others.

In one embodiment, a poster cannot respond to comments on the posts of the poster. Alternatively, the computing system may provide a private communication channel to allow a poster and a commentator to continue a thread of discussion under the original post of the user.

In one embodiment, a user is allowed to address a message to a particular user via @mention. The user may use @ followed by first name and last initial of the person OR first Initial and last name. For example, @marys or @msmith will both work for "Mary Smith."

In one embodiment, the envelope in the upper, left corner of the streamer is configured to include notifications icon. For example, it will blink green when the user has had some activity like a follow request, comment, like, or @mention. The user can click the icon if it's blinking.

In one embodiment, the users of the computing system may have "mutual follow" and/or "friends" relations. Before becoming friends, two users are required to first "mutually follow" each other in the social network hosted in the computing system of the present disclosure. Once friendship is established between two users, the users can use the super private "Friends Only" setting when posting and "Sort" user activity streamer by Friends list.

In one embodiment, the computing system of the present application has an unique arrangement in that a user can only find people through their posts in the streamer. If a user does not post, the user is invisible to other users, including "friends". Thus, if a user wants to find friends of the user on the system, the user may request the friends to post, or you can @mention them to appeal in their notifications.

In one embodiment, the computing system is configured to allow a user to de-friend or unfollow another user. For example, the user may go to the network tab of a user interface presented to the user, find a particular user to de-friend or unfollow, click the friendship status for an option to unfollow or revoke friendship in the social network hosted in the computing system.

In one embodiment, a user may block another user via clicking on the profile picture of the user to be blocked to get to their profile, and then clicking the black "Block" button. After user A blocks user B, the posts of user B will no longer appear in the streamer of user A; and the posts of user A will no longer appear in the streamer of user B.

In one embodiment, a map of the application of a user may include pins of different colors, which represent posts from various users. For example, green pins are used to represent the posts from friends and follows of the user, and black pins from people not connected to the user.

Community Guidelines

In one embodiment, the social networking application provided by the computing system is a public application. As a public platform, it has some guidelines that need following. A goal of the system is to protect all users of the system and promote a positive social environment.

Respect: users are required to refrain from publicly dissing, insulting, or attacking other users and students. Nobody deserves to be publicly demoralized and the system takes such attacks very seriously. Violating this rule could result in a permanent ban of the account of the offender.

Responsibility: a lot (if not most) of the community is in college. Posting public images and content that show inhumane or illegal activities is not responsible. Administrators of the system will remove such content and violations can result in permanent banning of the offender.

Prohibited: Posts that are threatening, abusive, harassing, intimidating, libelous, defamatory, illegal, or unlawful are prohibited. The system remove such content; and offender is subject to being banned.

In one embodiment, the same message posted over and over or related to commercial promotion are considered spam and disallowed.

In one embodiment, the system includes a mobile application configured for hyper-local social media posting.

Users of the mobile application may share their current experience anonymously with text and image, or with immediate attribution to their profile, but attribution erodes over a short period of time, leaving only the unattributed post. After a few hours, the unattributed posts erode and are not kept in the system.

The system allows users to provide anonymous feedback to places and people and institutions (to be seen, the posting feed must be watched closely because posts don't persist).

In one embodiment, the mobile application can be used to post any notice, comment or perspective with or without attribution. These posts are only viewable locally and for a limited period of time.

A streaming real-time feed shows posts from nearby users. Default feed shows all posts within user-selected proximity range posted within a recent window of time.

As time elapses, posted messages erode and are not kept in the system.

Recent posts (last 30 minutes) can contain the name and image of the posters and depending on posters preference settings, link to a profile view that includes a short user profile message, the average number of "derodes" (further described below) per post that posts of the user have received, and a button to request to "follow" that poster and thus receive their posts regardless of proximity.

In one embodiment, less recent posts (30 minutes to one hour) can contain the profile image of the poster, but not the name, and won't link to the posters profile.

Older posts (e.g., having been posted for more than a threshold number of hours, e.g., 1 hour) do not have any of the posters information (only the post text and a camera image if added to the post).

After a further longer time of period (e.g., 2 hours), only posted images remain, without attribution or accompanying text.

Thus, the information about a post erodes gradually over a period of time based on a pre-configured schedule.

In one embodiment, a gallery of images taken by people in proximity to the location of a user is shown below the most recent posts. Pictures are only kept beyond two weeks if they are deroded above a certain threshold set low enough to adequately populate the gallery.

In one embodiment, posts with both text and image which are deroded by users might display the text.

In one embodiment, the system provides a user derode function for the entire post or for image only.

In one embodiment, photos can have persistent association with the user profile which posted them at the election of the user (e.g., to foster quality image posting to locale).

User Stories

He heard a large concert or event was happening somewhere in central park but he wasn't sure what it was or who was performing. He pulled out his phone and got on the mobile application of the present disclosure to check his proximity feed to see if there was anyone nearby posting about the event or concert.

He wondered what bar was the most popular nearby so he checked the mobile application to see if anyone was posting pictures or talking about nearby nightlife.

Tom wondered if anyone else in his dorm (Jones Hall) was going to the Snoop Dog concert that night so posted on the mobile application "Anyone else from Jones going to the snoop dog concert?" He checked every couple minutes refreshing his proximity feed to see if anyone nearby posted something as a response to his post.

James had been excited about an idea he had, but he didn't want to talk about it openly with his friends, he worried what they might think. He realized if he used the mobile application of the present disclosure he could anonymously post it and most of his friends, classmates, and college campus could see it but no one could connect it back to him. On the other hand, if he posted it publicly he might gain from association with the post. Knowing that even if he did post it publicly it would only take a half hour before his personal information would no longer be associated with the message anyway gave him some comfort. The thought that either way, the post would be gone by tomorrow gave James the courage to post what he could never have put on Facebook or Twitter.

The party was underway but could use more people; John put a bulletin message up on the mobile application of the present disclosure along with a picture of his smiling friends by the keg with the invitation to come by.

In one embodiment, a user may adjust user display settings to control feed views.

For example, the user can adjust the range of posts shown in the feed from 10 miles down to 1.00 yards using buttons or slider provided on the mobile application.

In one embodiment, narrower ranges depend on accurate location data from the user device running the mobile application. Without accurate location data from the user device, the range defaults to local region (e.g., 10 miles based on cell tower).

For example, a user set filters on the feed view to selectively receive posts from all, from followed only, from not followed only, etc.

In some embodiments, filters are provided based on post types, such as bulletin, comment, props/affirmation, rants, wish/dream/aspiration, deal, event, sarcasm. The system may provide options to categorize it, using buttons or auto-categorization of post type.

In one embodiment, the mobile application is configured with user interfaces to support various user actions, such as locate a post on a map, posting a message, create a profile image, erode or derode a post, etc.

For example, to location a post, the user may click on a Map icon below the post to bring up a map screen and locates the origin of the post by range from current location and bearing quadrant (NE, SE, SW, NW).

For example, a user is provided with an option to post anonymously in an "eVadr" mode. The anonymously posted message has no link to the profile of the poster, no attribution to the poster, and no geo-location of the poster; and the message disappears faster if not extended by like and comment actions.

Users can post with attribution but without link to profile, which prevents follow requests.

In one embodiment, users are provided with options to set post to JAM eRadr, which removes the viewable location resolution of the post, making use of eRadr by other users ineffective.

In one embodiment, when a user posts from a place with GPS off (or otherwise makes the location of the user device not available to the mobile application), the mobile application uses the centroid of the general home location (e.g., campus) or the closest location determined by cell towers as the location of the post.

In one embodiment, the user of the mobile application can create a profile image using the camera of the user device on which the mobile application is running.

Users can post an image from the camera along with their text. Optionally, the user may elect to have their attribution persist with the image. Profile can include up to a threshold number photos that have been reroded enough to qualify. This could lead to image posting for the purpose of getting ones' profile gallery filled.

The rerodes of images from people not following the user have higher weight than rerodes from people following.

A retention gallery of the hall-of-frame photos from a given area is available in the UI. This gallery can be reduced down to a range around a specific longitude-latitude pair, the range can match the range restriction set by the user for the feed view.

Below every post/image is a symbol which represents the location of the post. The user may click this to bring up the eRadr map that shows the range and bearing quadrant location of the photo.

If someone posts something a user likes or finds important, the user may derode the message. By eroding the message, the message decay rate is slowed, and the poster's profile accumulates a "derode" point.

If the deroding user is in a location different from the original post, then the message will be re-posted as if in the deroding user's location, and will display an icon that represents it as a derode re-post.

Derodes are positive ranking actions by a user, but not identical to re-tweets which are often used as attributed affirmations of a post with re-circulation by friends of the poster; the derode action only has the value of extending the duration of a post in its original location. If the post is deroded by a connected friend outside the original location, this results in re-posting it into the location of the connected user who deroded the post. As a result, other viewers in the original location will see it beyond the normal window of erosion, and the post appears in the feed in the location of a deroding user who is outside that location.

Optionally, the derode action is communicated to the poster with reference to the profile the deroding users, indicating that a nearby friend or stranger likes the post of the poster.

If someone posts something the viewer does not like or the viewer feels is obnoxious, the viewer can erode the post and make it disappear faster.

When a user erodes a message other users will not be notified; and the message will simply disappear faster than the default rate.

Users are tracked by frequency of the use of erode; and limited effect of erode actions is implemented on profiles with excessive use of the erode function (could be limited # within period).

A user may follow people of interest if they allow the user to follow in response to the request to follow.

In embodiment, an icon or different treatment on posts in the feed distinguishes profiles in the feed that are from those you follow.

Filters on the feed view allows display of activity from only those the user follows (creates walkie-talkie type interaction among connected group).

When a followed user posts anonymously, it shows on followers feed as a followed profile, but without any indication of who posted it.

Permission to follow can be revoked easily to unfollow on the list of people who are following you.

Bilateral follow (e.g., a person I follow who also follows me back) creates a capability to "jump-space". By clicking on the profile image of a bilaterally connected friend in another location, the user can then click to a view that shows their activity feed in the location where they are at that moment. Jump-space function makes it possible for content to be drawn into a new location as follows: by deroding a post from another location that is viewable by a user through a bilateral follow, it is then re-posted in the area of the user.

If a deroded post is displayed in a new location as a result of action by a connected user outside the original location (e.g., >10 miles), the post will show the source location of the post.

Users can invite others to join the social network hosted on the computing system of the disclosure via iMessage, text message, or by email from within the app. For example, a user may scroll contact book in phone for iMessage users; if the user is in iMessage, the user may send an invite to the iMessage users to allow them to sign up in the social network immediately.

In one embodiment, the mobile application allows a user to set an alert to be notified of a post which meets certain criteria.

In one embodiment, the computing system is configured to provide short-range and short-duration social media sharing and for social discovery. Students may use it to see and interact with fellow students nearby who are not already a part of their social network in certain social networking sites, such as Facebook.

In one embodiment, the system focuses on safe community interactions, strong moderation, better privacy, no profiling, social mobility (doesn't depend on the friend network of a user), etc.

In one embodiment, the computing system is not configured to preserve the content added by user to their posts for long beyond the expiration time. The content is normally only viewable via mobile applications on mobile devices (e.g., iPhone, IPad, and Android devices), and in the area near where it was posted. A post generated on a campus is available around the campus until the post expires. Upon expiration, the post, including the text and photo content, is deleted from the servers of the computing system. However, there is no guarantee that other users of the service would not be able to keep some of the content in some forms on other devices.

In one embodiment, the system is designed to focus on what is happening right here and right now, and pays careful attention to content moderation to keep students safe in an open college community.

For example, users on the system can be invisible. Until a user posts, no one can know that the user is even on the computing system. When a user posts anonymously, other users can't tell who the poster is. When a user posts with name, the user begins to get the benefit of system, which benefit is the introduction of the poser to new people in the local community of the poster. A user may selectively ignore another user, or use the block function of the system such that they do not see each other's presence on the system.

When a user votes to like a post using the mobile application, the user is identified only to the author of the post. When the user provides a comment on a post using the application, the comment is presented only to the author of the post. The identities of the friends of a user in the social network hosted on the computing system are not exposed to other users via the system (unless the user @mention them as a friend in a post).

Thus, the system of the present disclosure offers more privacy than other social media, and makes it easier to engage carefully with just those people a user finds connection with.

The system of the present disclosure is designed to have community-driven moderation to defend against bullying, hate speech, porn, and illegal activity. In one embodiment, after a predetermined number of unique individuals (e.g., two) flag a post, the post is removed from the streamer of the system. The system also defends against abuse of the flag function. Users who work together to suppress acceptable speech will lose the flag function.

In one embodiment, flag-worthy violations of our terms of service include: Bullying; Racism; Hate Speech; illegal Activity; and Obscene/Explicit.

In one embodiment, users of the system may flag the content of a violator off the streamer; and if the violator have enough of violations being flagged off the streamer, the violator will be banned from using the system.

In one embodiment, a post is presented in a mobile application with a dislike button (thumbs down) and a like button (thumbs up). A viewer may select the dislike button to record a count of dislike post, or select the like button to record a count of like of the post. Just a few net dislikes on an anonymous post can cause the post to disappear from the streamer. Lots of likes on a "No Limit" post can keep the post stay around for up to 10 days in the Most Liked sort of the streamer, and expand in viewable range across the country. To avoid that time extension and visibility, the author of the post may optionally set a limit on the post (e.g., down to 30 minutes and 100 yards). Thus, the system is a curated streamer of great content, where well-liked content stays around, and dis-liked content disappears quickly.

The system provides a social discovery application with unique peer moderation and enhanced privacy controls that create a hyper-local crowd-sourced entertainment stream where a user can meet new people around the user.

The system is configured with better privacy protection. An author of a post is allowed to set the duration of the post, which can be set to be eroded from the system in as little as thirty minutes. The author may delete the post at any time and thus remove the post from the streamer for distribution. Users are provided with the options to broadcast their posts to "friends only", "followers" or "public". Users can are provided with a broadcast range setting that may limit the broadcast range to as little as 100 yards.

The anonymous feature of the system allows users to post invisibly, but only a few times a day; and anonymous posts are configured to be "fragile" such that they can be knocked off the streamer easily.

In one embodiment, the servers of the system are not configured to persistently retain posts and comments. They are scrubbed of the system soon after their expiration.

Duration and visibility of posts in the system are set by the users of the system. When these aren't limited by the author, a custom peer moderation system determines which posts remain to be seen: likes and dislikes affect the erode rate and view range of a post. In one embodiment, two flags on a post can cause the post to be removed from the streamer for distribution.

The system does not keep expired posts, does not profile what a user likes and/or who the user is friends with, does not show present friends of a user to other users, does not external access to the data of a user.

Although the servers of the system do not save the user posts and comments, a user of the mobile application may take a screen shot, post it in a different system, and/or store it somewhere. Thus, although the relative safety of the online identity of a user on the computing system of the present disclosure is better than on other social media, a screen shot can be taken off the mobile application; and therefore, the users use good judgment when posting.

User Interfaces

FIG. 1 shows a user interface configured to present messages in a social network according to one embodiment.

In FIG. 1, the user interface is configured on a mobile device (100) running a mobile application. The user interface provides a view of the posts presented via a streamer (101) of the system in accordance with the privacy policy of the system and the posts, the social relations of the user of the user interface and the authors of the posts, and the profile of the user of the user interface, etc.

In FIG. 1, each post presented via the streamer may include a post header, one or more images (e.g., 107) or video clips of the post, the text (109) of the post, a set of status indicators (e.g., 111, 113, 115) of the post, and a set of user interface elements (e.g., 117, 119, 121) for operating on the post.

In one embodiment, a post header includes a profile picture (e.g. 103, or 105) that represents the author of the respective post. When the post is submitted in an anonymous mode, a standardized profile picture may be used to indicate that the post is submitted anonymously. When the post is submitted in a non-anonymous mode, the profile picture is a public photo specified in the user profile of the author of the post to represent the profile of the author.

In FIG. 1, the post header includes the date and time of the post (123), the location of the post (125), a targeted audience of the post (127), etc.

In FIG. 1, the post header including the profile picture (105) is followed by an image (107) of the post, the text (109) of the post, and a post footer showing the net count (111) of likes/dislikes, the number (113) of comments received as responses to the post, and an expiration time indicator (115) showing the remaining life of the post.

In FIG. 1, the post footer further includes a like button (117), which can be selected by the user of the mobile device (100) to increase the like count for the post.

In FIG. 1, the post footer further includes a dislike button (119), which can be selected by the user of the mobile device (100) to increase the dislike count for the post.

In FIG. 1, the post footer further includes a message button (121), which can be selected by the user of the mobile device (100) to obtain a user interface to compose a comment on, or response to, the post.

In one embodiment, when a post presented by the streamer is authored by the user of the mobile device (100), the user may select the icon corresponding to the number (113) of comments received for the post to obtain a user interface showing the list of comments and the users who authored comments; and the user may select the icon corresponding to the count (111) of likes/dislikes to see the list of users who activated the respective like button (117) for the post while viewing the post on their respective mobile devices.

When a post presented by the streamer is not authored by the user of the mobile device (100), the icon corresponding to the number (113) of comments received for the post is deactivated to prevent the user from viewing the list of comments and the users who authored comments; and similarly, the icon corresponding to the count (111) of likes/dislikes is also deactivated to prevent the user of the mobile device (100) from viewing the list of users who activated the respective like button (117) for the post while viewing the post on their respective mobile devices.

However, the mobile application does not show the identify of users who activated the respective dislike button (119) for the post while viewing the post on their respective mobile devices, regardless of whether the user of the mobile device (100) is the author of the respective post.

In FIG. 1, the "anchor" button can be used to selectively "anchor" the user to a center of a predefined community. When the application of the user is anchored to a community, the user is considered virtually presented in the geographical region of the community.

Figure 5:
FIG. 5 shows a user interface configured to generate a new post according to one embodiment.
Figure 6:
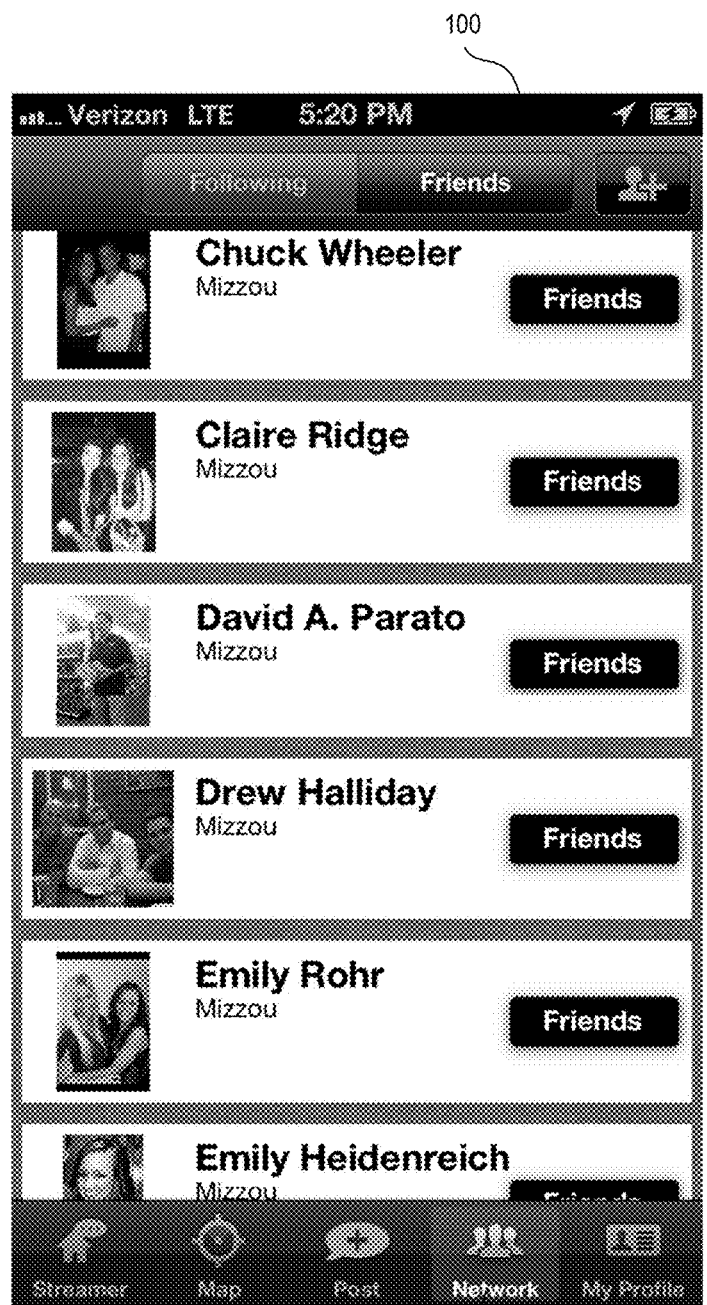
FIG. 6 shows a user interface configured to manage social network connections according to one embodiment.
Figure 7:
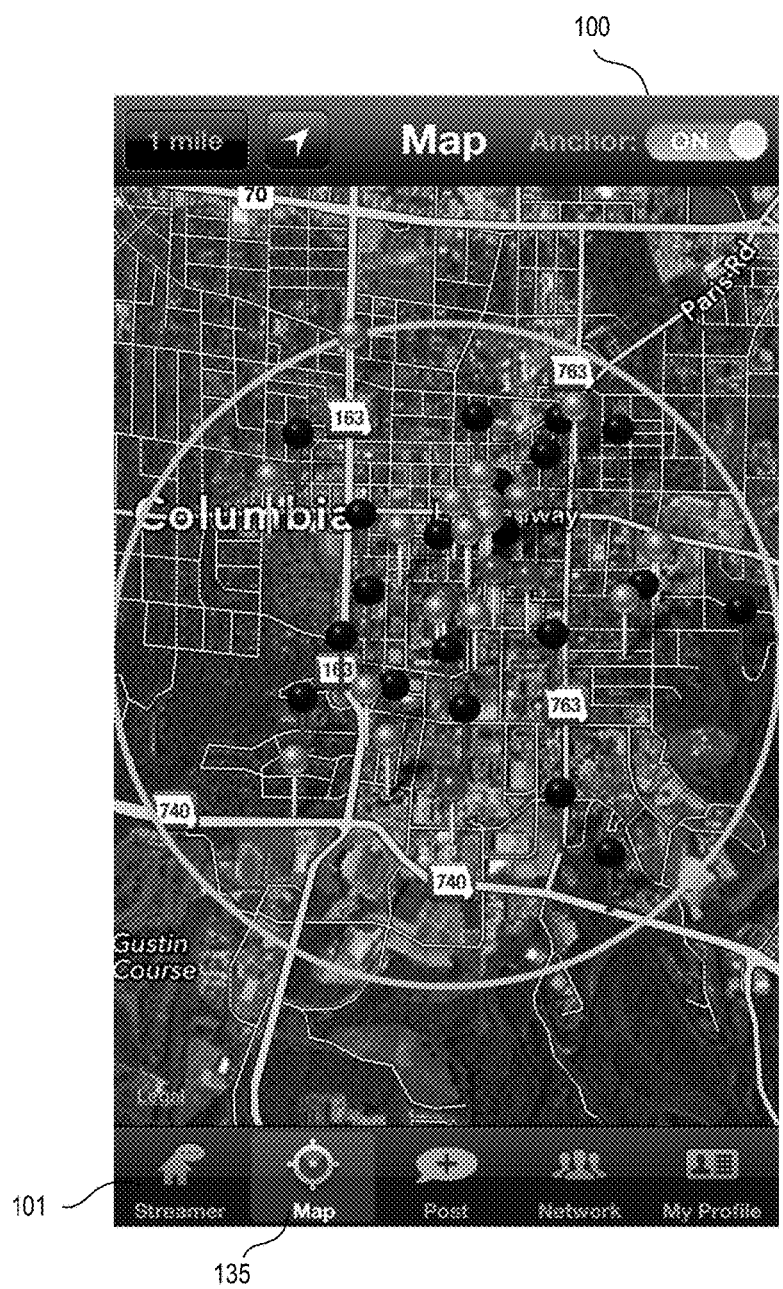
FIG. 7 shows a user interface configured to present the locations of posts according to one embodiment.

In FIG. 1, the map icon (135) can be selected to request a view of a map of posts, as illustrated in FIG. 7. The post icon (137) can be selected to request a user interface to compose a new post, as illustrated in FIG. 5. The network icon (139) can be selected to request a user interface to manage the social network connections of the user of the mobile device (100), as illustrated in FIG. 6. The profile icon (129) can be selected to request a user interface to manage the profile information of the user, including a photo that is to be used to represent the profile of the user in non-anonymous posts of the user, likes given by the user to posts authored by other users, and the comments provided by the user to posts authored by other users.

In FIG. 1, the sort button (133) can be selected to sort the posts presented by the streamer.

Figure 2:
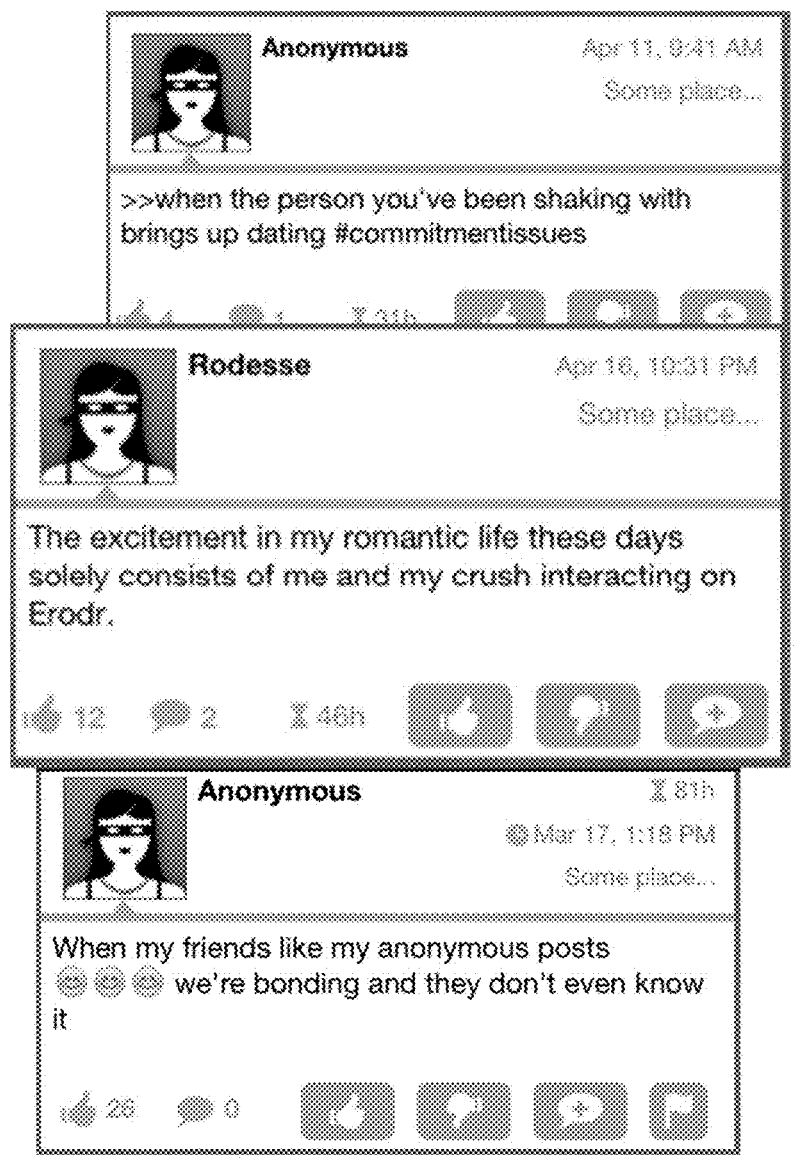
FIG. 2 shows an example of switching between posting anonymously and non-anonymously using the same application according to one embodiment.

FIG. 2 shows an example of switching between posting anonymously and non-anonymously using the same application according to one embodiment. For example, the user may choose to post a message anonymously and post another message non-anonymously. The system is configured to present the posted messages accordingly, without revealing any link between the posted messages.

Figure 3:
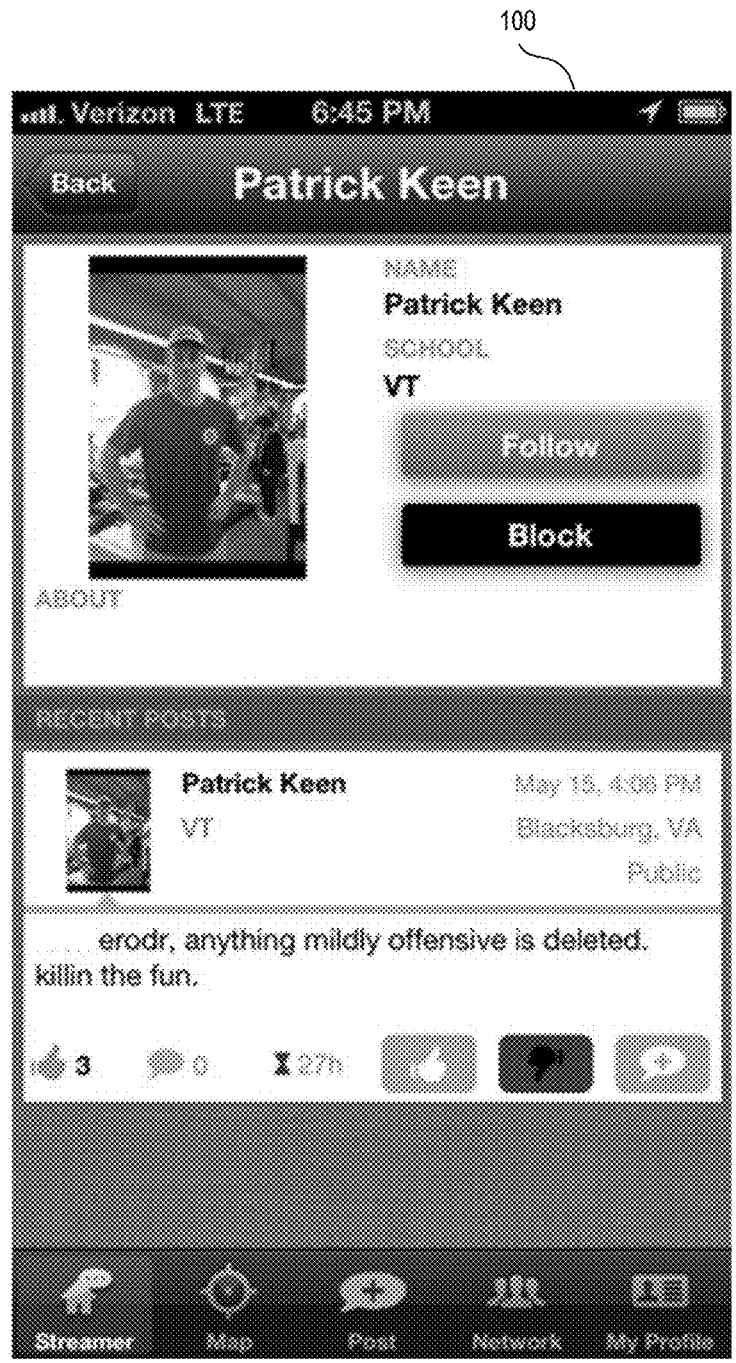
FIG. 3 shows a user interface configured to adjust a social network connection according to one embodiment.

FIG. 3 shows a user interface configured to adjust a social network connection according to one embodiment. In one embodiment, after a user selects the profile picture (e.g., 103, 105), the user interface illustrated in FIG. 3 is presented to present a "follow" button and a "block" button.

If the "follow" button is selected, the user interface generates a request for the user of the mobile device (100) to follow the posts of the user represented by the profile (e.g., named "Patrick Keen" in FIG. 3). After the user being requested for the follow relation (e.g., "Patrick Keen") approves the request, the user of the mobile device (100) can receive the posts of the user directed to his/her followers.

If the "block" button is selected, the server of the system prevents the messages of the user of the mobile device (100) from appearing in the application of the user represented by the profile (e.g., named "Patrick Keen" in FIG. 3), and prevents messages of the user represented by the profile (e.g., named "Patrick Keen" in FIG. 3) from being presented to the user of the mobile device (100).

Figure 4:
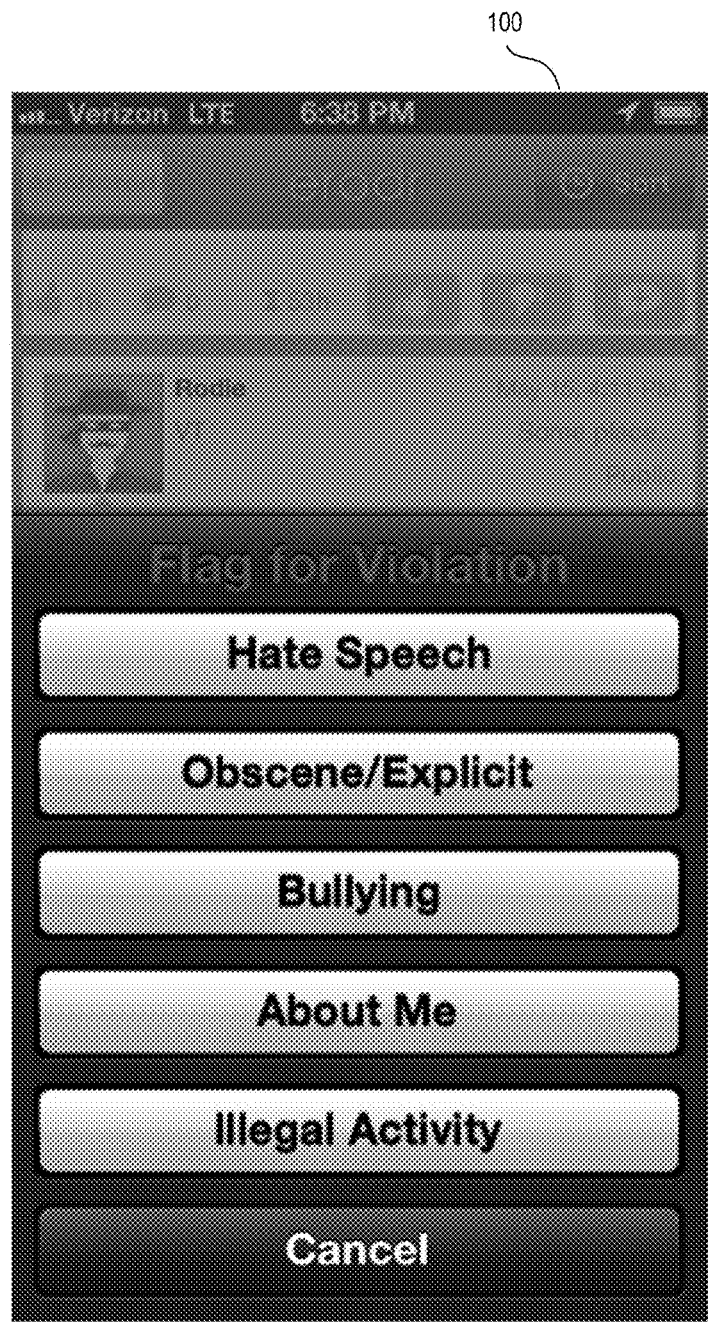
FIG. 4 shows a user interface configured to flag a post for policy violation according to one embodiment.

FIG. 4 shows a user interface configured to flag a post for policy violation according to one embodiment. In FIG. 4, the user of the mobile device (100) may select one of the categories (e.g., "Hate Speech", "Obscene/Explicit", "Bullying", "About Me", "Illegal Activity"), as reasons for flagging a post.

FIG. 5 shows a user interface configured to generate a new post according to one embodiment.

In FIG. 5, the user interface allows the user to edit the text of the post, select a photo for the post, select the anchor option, specify a broadcast range for the post, set a time limit for the expiration of the post, select an audience filter for the post, and indicate whether the post is to be broadcast anonymously or non-anonymously.

In one embodiment, when the anchor is selected to be on for the post, the post is considered to be from the geographical center of the community to which the anchor is locked; otherwise, the location of the post is based on the current location of the mobile device (100) at the time the post is submitted.

In one embodiment, a user has a predetermined number of limit on anonymous posts the user may submit during a predetermined time period (e.g., a day, a week, a month).

FIG. 6 shows a user interface configured to manage social network connections according to one embodiment. In FIG. 1, the user of the mobile device (100) may view a list of other users that the user is following and select a candidate from the list for establishing a friend relationship.

FIG. 7 shows a user interface configured to present the locations of posts according to one embodiment. The posts visible to the user of the mobile device (100) in the streamer (101) are represented as pins on the map at the locations of the posts.

In one embodiment, the pins are selectable to view the content of the respective posts.

In one embodiment, green pins represent friends of the user of the mobile device (100) which friends have set to turn Radar on. The user may select a green pin to view the name and profile of the corresponding friend represented by the green pin.

In one embodiment, a black pin represents a hotspot that has a concentration of users with Radar on.

Figure 8:
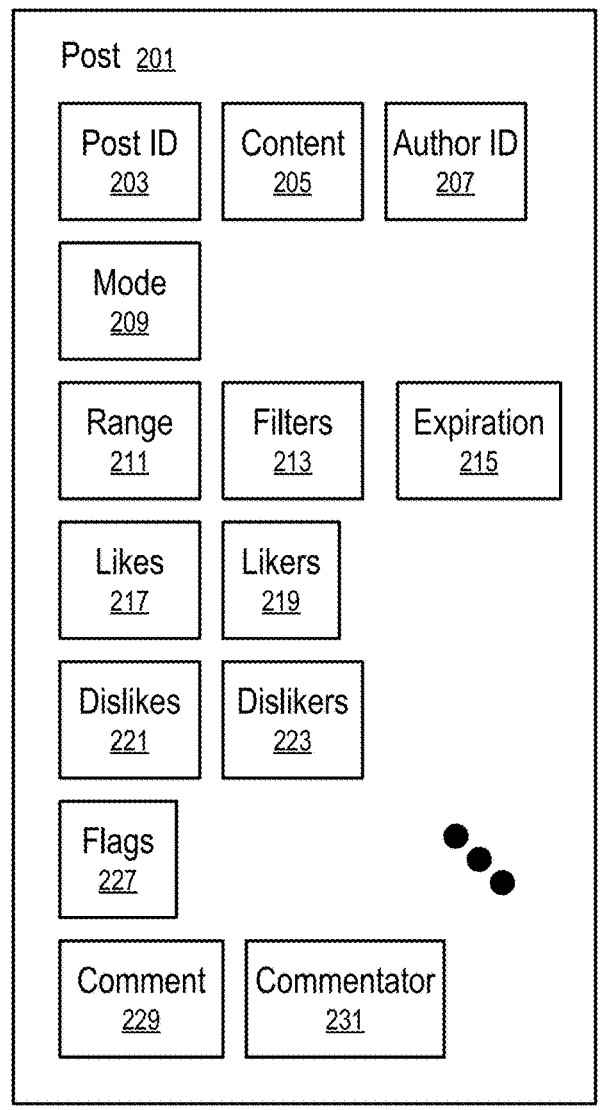
FIG. 8 shows a data structure configured to manage a post according to one embodiment.

FIG. 8 shows a data structure configured to manage a post according to one embodiment. In FIG. 8, a post (201) includes the content (205), such as text, image, video, etc. The post (201) is assigned a post ID (203) to uniquely identify the post from the set of posts currently in the system. The post (201) has a mode (209) indicator, indicating whether the post is to be presented anonymously, or non-anonymously.

In FIG. 8, the post (201) further includes an author ID (207) that identifies the user profile of the author of the post (201). In one embodiment, when the post (201) is presented in an anonymous mode, the post is presented in association with an anonymous profile; and the author ID (207) and its associated profile information is not revealed to users other than the author of the post (201). When the post (201) is presented in a non-anonymous mode, the post is presented in association with the user profile of the author identified by the author ID (207) (e.g., presented by the profile picture of the user profile).

In FIG. 8, the post (201) includes a range (211), applicable audience filters (213), and an expiration time period (215). The author of the post (201) may explicitly specify the parameters (211, 213, . . . , 215). Alternatively, the author may allow the system to automatically determine the default values of the parameters.

In one embodiment, the range (211) and the expiration time period (215) specified by the author of the post (201) are upper limits for the post (201). The likes (217) and dislikes (221) provided by the other users may dynamically adjust the range (211) and the expiration time period (215), with likes (217) to extend the range (211) and expiration time period (215) and the dislikes (219) to reduce the range (211) and expiration time period (215), as functions of the likes (217) and/or dislikes (219), or a function of a net count (e.g., likes (217) minus dislikes (219)).

In FIG. 8, the likes (217) represents the count of activation of the like button (e.g., 117) configured for the post (201) and presented on devices of the viewers; the dislikes (221) represents the count of activation of the dislike button (e.g., 119) configured for the post (201) and presented on devices of the viewers of the post.

In FIG. 8, the system tracks the profile identifications of likers (219), the users who activated the like button for the post (201), and the profile identifications of dislikers (223), the users who activated the dislike button for the post (201). The mobile application may present the list of likers (219) to the author of the post identified by the author ID (207), but does not present the list of dislikers (223).

In one embodiment, the system is configured to analyze the patterns of dislikes to identify users who may not like each other, regardless of the content of the posts, and automatically invoke blocks for the users who may not like each other.

In FIG. 8, the post (201) includes a count of flags (227) the post (201) received from viewers. The count of flags (227) is configured to reduce the range (211) and the expiration (215) of the post (201).

In FIG. 8, the post (201) may include one or more comments (229) received from respective commentators (231) of the respective comments (229). The mobile application is configured to present the comments (229) and the commentators (231) to the author of the post (201) identified by the author ID (207), but not other users.

Advertising

The mobile application of the system allows the targeted advertising in a high density target of audience, with high frequency of attention. The users like and dislike the advertisements and offers in the streamer and thus provide anonymous feedback with demographics. The feedback provides real time responses to the advertisements and offers and supports real-time offer response analytics. Thus, the analytics with demographics can be used by advertisers to enhance and optimize targeting and modify offers underway.

For example, local businesses and national advertisers seeking the college audience may provide advertisements or offers with self-service paid placements on local streamers.

For examples, the advertisements may be presented as real-time expiring offers, deals for students (limited budgets, price responsive, eager to spend), premium placement offer (e.g., tonight's erodr flashmob deal), proximity offers (e.g., geo-fenced push notifications to users of the mobile applications), targeted offers (e.g., offers to local men 20-22), automatic offers (e.g., local businesses purchase and schedule automatic Birthday awards for users). Users may activate the like button for an Offer to redeem, then fulfill in person or on the web. The users may post on location with @mention to earn bonus offers.

Computing Apparatus

Figure 9:
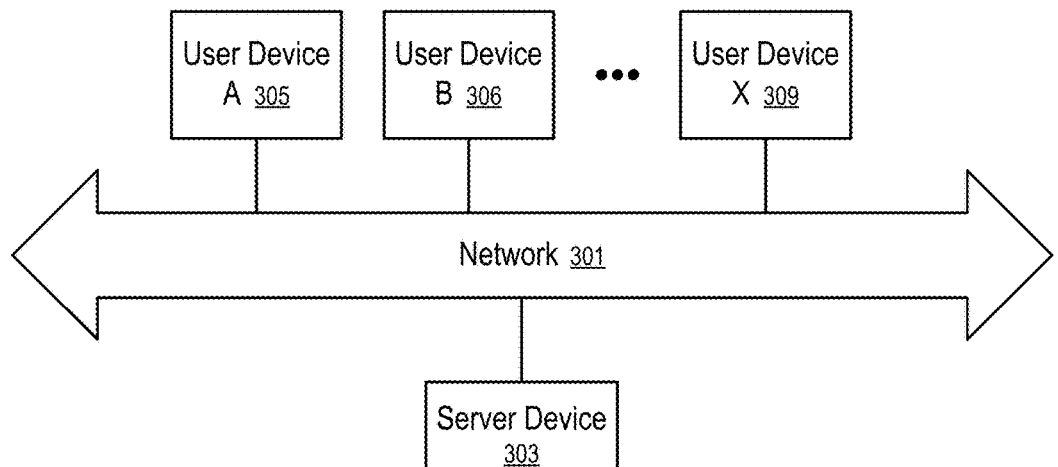
FIG. 9 shows a system configured to provide social network services according to one embodiment.

In one embodiment, the operations discussed are configured to be performed on a computing apparatus, such as a server device (303) and/or one or more user devices (305, . . . , 309) illustrated in FIG. 9.

Figure 10:
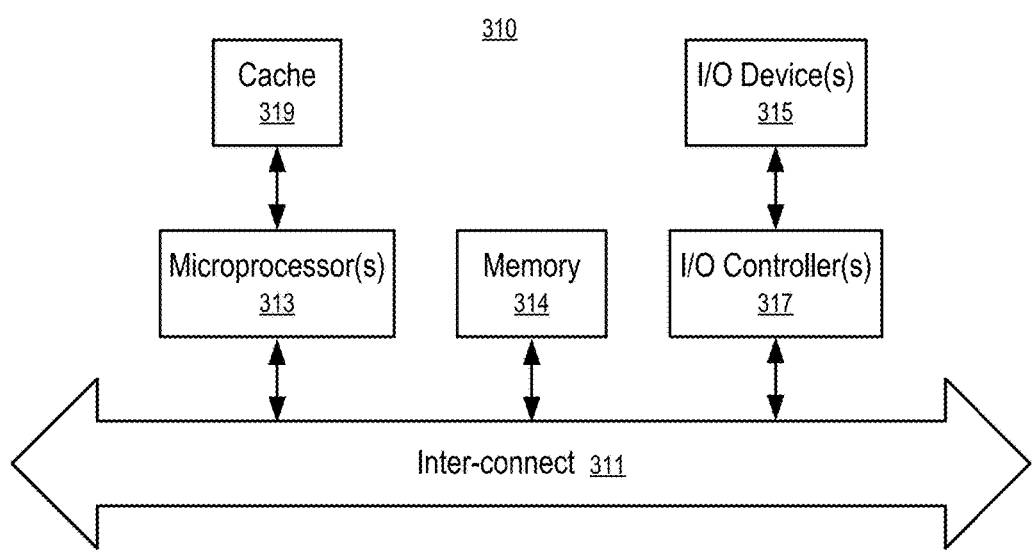
FIG. 10 illustrates a data processing system according to one embodiment.

FIG. 9 illustrates a system configured to provide services according to one embodiment. In one embodiment, the operations discussed above are implemented at least in part in a service device (303), which can be implemented using one or more data processing systems as illustrated in FIG. 10. A plurality of users devices (e.g., 305, 306, . . . , 309) are coupled to the service device (303) via the network, which includes a local area network, a wireless communications network, a wide area network, an intranet, and/or the Internet, etc.

In one embodiment, the user device (e.g., 305) can be one of various endpoints of the network (301), such as a personal computer, a mobile computing device, a notebook computer, a netbook, a personal media player, a personal digital assistant, a tablet computer, a mobile phone, a smart phone, a cellular phone, etc. The user device (e.g., 305) can be implemented as a data processing system as illustrated in FIG. 10, with more or fewer components.

In one embodiment, at least some of the components of the system disclosed herein can be implemented as a computer system, such as a data processing system illustrated in FIG. 10, with more or fewer components. Some of the components may share hardware or be combined on a computer system. In one embodiment, a network of computers can be used to implement one or more of the components.

In one embodiment, data discussed in the present disclosure can be stored in storage devices of one or more computers accessible to the components discussed herein. The storage devices can be implemented as a data processing system illustrated in FIG. 10, with more or fewer components.

FIG. 10 illustrates a data processing system according to one embodiment. While FIG. 10 illustrates various parts of a computer system, it is not intended to represent any particular architecture or manner of interconnecting the parts. One embodiment may use other systems that have fewer or more components than those shown in FIG. 10.

In FIG. 10, the data processing system (310) includes an inter-connect (311) (e.g., bus and system core logic), which interconnects a microprocessor(s) (313) and memory (314). The microprocessor (313) is coupled to cache memory (319) in the example of FIG. 10.

In one embodiment, the inter-connect (311) interconnects the microprocessor(s) (313) and the memory (314) together and also interconnects them to input/output (I/O) device(s) (315) via I/O controller(s) (317). I/O devices (315) may include a display device and/or peripheral devices, such as mice, keyboards, modems, network interfaces, printers, scanners, video cameras and other devices known in the art. In one embodiment, when the data processing system is a server system, some of the I/O devices (315), such as printers, scanners, mice, and/or keyboards, are optional.

In one embodiment, the inter-connect (311) includes one or more buses connected to one another through various bridges, controllers and/or adapters. In one embodiment the I/O controllers (317) include a USB (Universal Serial Bus) adapter for controlling USB peripherals, and/or an IEEE-1394 bus adapter for controlling IEEE-1394 peripherals.

In one embodiment, the memory (314) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of tangible, non-transitory computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented on a mobile computing device, the method comprising:
    authenticating, by the mobile computing device, a user of the mobile application executing on the mobile computing device against a user profile;
    presenting, via the mobile application, a user interface to compose a message, the user interface including an option selectable to whether post the message under an anonymous profile or a user profile;
    receiving, via the mobile application, messages posted by users in a social networking system, the messages including messages posted anonymously and non-anonymously; and
    presenting, via the mobile application, the messages within expiration time periods of the messages, wherein each respective message presented in the mobile application includes:
        an icon corresponding to a count of likes of the respective message;
        a like button selectable to increase a count of likes of the respective message;
        a dislike button selectable to increase a count of dislikes of the respective message;
        a message button selectable to obtain a user interface to compose a response to the message;
        the count of the likes of the respective message;
        a count of responses directed to the respective message; and
        an indication of time to expiration of the respective message;

wherein when the respective message is authored by the user, the icon is selectable to show a list of users who provided the likes of the respective message; and wherein when the respective message is not authored by the user, the icon is deactivated to prevent presentation of the list of users who provided the likes of the respective message.

2. The method of claim 1, wherein anonymous messages having indications of being posted anonymously are presented according to the anonymous profile to prevent revealing of author identifications of the anonymous messages to users other than respective authors of the anonymous messages; and non-anonymous messages having indications of being posted non-anonymously are presented according to user profiles of respective authors of the non-anonymous messages to present identities of the respective authors of the non-anonymous messages.

3. The method of claim 2, wherein the user interface is configured with an input field to specify a geographical range, wherein the message is broadcast to users within the geographical range from a location of the message posted from the user interface.

4. The method of claim 3, wherein the location of the message is a location of the mobile computing device.

5. The method of claim 4, wherein the location of the message is a location of the mobile computing device at a time the message is posted from the mobile computing device.

6. The method of claim 3, wherein the user interface is configured with an input field to specify an expiration time period, wherein the message posted from the user interface is removed from broadcasting after the expiration time period.

7. The method of claim 3, wherein the user interface is configured with an input field to specify an audience filter, wherein broadcasting of the message posted from the user interface is based on the audience filter.

8. The method of claim 7, wherein the audience filter is based on a predetermined social networking relationship with the user in the social networking system.

9. The method of claim 3, wherein the location of the message is a center of a community of users in which community the user is based.

10. The method of claim 1, further comprising:
presenting, via the mobile application, a first message posted non-anonymously under a profile of a first user; and
presenting, via the mobile application, a second message posted anonymously by the first user under an anonymous profile, wherein the first message and second message are presented in the mobile application without revealing a connection of source between the first message and the second message.

11. The method of claim 1, further comprising:
adjusting a range of broadcasting of the respective message based on the count of likes.

12. The method of claim 11, further comprising:
adjusting a range of broadcasting of the respective message based on the count of dislikes.

13. The method of claim 1, further comprising:
adjusting a range of broadcasting of the respective message based on the count of likes and the count of dislikes.

14. The method of claim 1, further comprising:
adjusting an expiration time limit of the respective message in accordance with a function of the count of likes.

15. The method of claim 14, further comprising:
adjusting an expiration time limit of the respective message in accordance with a function of the count of dislikes.

16. A non-transitory computer storage media storing instructions configured to instruct a mobile computing device to perform a method, the method comprising:
authenticating, by the mobile computing device, a user of the mobile application executing on the mobile computing device against a user profile;
presenting, via the mobile application, a user interface to compose a message, the user interface including an option selectable to whether post the message under an anonymous profile or a user profile;
receiving, via the mobile application, messages posted by users in a social networking system, the messages including messages posted anonymously and non-anonymously; and
presenting, via the mobile application, the messages within expiration time periods of the messages, wherein each respective message presented in the mobile application includes:
an icon corresponding to a count of responses directed to the respective message;
a like button selectable to increase a count of likes of the respective message;
a dislike button selectable to increase a count of dislikes of the respective message;
a message button selectable to obtain a user interface to compose a response to the message;
the count of the likes of the respective message;
a count of responses directed to the respective message; and
an indication of time to expiration of the respective message;
wherein when the respective message is authored by the user, the icon is selectable to show the responses and users who provided the responses to the respective message; and
wherein when the respective message is not authored by the user, the icon is deactivated to prevent presentation of the responses and users who provided the responses to the respective message.

17. A mobile computing apparatus, comprising:
a set of input and output devices;
at least one microprocessor; and
a memory storing instructions configured to instruct the at least one microprocessor to operate the set of input and output devices to:
authenticate, by the mobile computing device, a user of the mobile application executing on the mobile computing device against a user profile;
present, via the mobile application, a user interface to compose a message, the user interface including an option selectable to whether post the message under an anonymous profile or a user profile;
receive, via the mobile application, messages posted by users in a social networking system, the messages including messages posted anonymously and non-anonymously; and
present, via the mobile application, the messages within expiration time periods of the messages, wherein each respective message presented in the mobile application includes:
an icon corresponding to a count of responses directed to the respective message;

a like button selectable to increase a count of likes of the respective message;

a dislike button selectable to increase a count of dislikes of the respective message;

a message button selectable to obtain a user interface to compose a response to the message;

the count of the likes of the respective message;

a count of responses directed to the respective message; and an indication of time to expiration of the respective message;

wherein when the respective message is authored by the user, the icon is selectable to show at least one of:

a list of users who provided the likes of the respective message; and the responses and users who provided the responses to the respective message; and wherein when the respective message is not authored by the user, the icon is deactivated to prevent presentation of at least one of:

the list of users who provided the likes of the respective message; and the responses and users who provided the responses to the respective message.

18. The mobile computing apparatus of claim 17, wherein:

anonymous messages having indications of being posted anonymously are presented according to the anonymous profile to prevent revealing of author identifications of the anonymous messages to users other than respective authors of the anonymous messages; and non-anonymous messages having indications of being posted non-anonymously are presented according to user profiles of respective authors of the non-anonymous messages to present identities of the respective authors of the non-anonymous messages.

* * * * *